US007289973B2

(12) United States Patent
Kiessig et al.

(10) Patent No.: US 7,289,973 B2
(45) Date of Patent: *Oct. 30, 2007

(54) GRAPHICAL USER INTERFACE FOR SYSTEM AND METHOD FOR MANAGING CONTENT

(75) Inventors: Rick Kiessig, Los Altos, CA (US);
David A. Yost, Los Altos, CA (US);
John D. Mathon, Atherton, GA (US)

(73) Assignee: Mathon Systems, Inc., Los Altos, CA (US)

( * ) Notice: Subject to any disclaimer, the term of this patent is extended or adjusted under 35 U.S.C. 154(b) by 273 days.

This patent is subject to a terminal disclaimer.

(21) Appl. No.: 10/632,087

(22) Filed: Aug. 1, 2003

(65) Prior Publication Data

US 2004/0133588 A1   Jul. 8, 2004

Related U.S. Application Data

(60) Provisional application No. 60/434,418, filed on Dec. 19, 2002.

(51) Int. Cl.
*G06F 17/30* (2006.01)
(52) U.S. Cl. .......................................... 707/1; 707/102
(58) Field of Classification Search ................ 707/1–2, 707/100, 202–205
See application file for complete search history.

(56) References Cited

U.S. PATENT DOCUMENTS

| 6,055,534 | A | 4/2000 | Nishino ........................ 707/10 |
|---|---|---|---|
| 6,216,122 | B1 | 4/2001 | Elson ............................. 707/3 |
| 6,240,429 | B1 | 5/2001 | Thornton et al. ........... 707/500 |
| 6,253,217 | B1 | 6/2001 | Dourish et al. ............. 707/500 |
| 6,272,678 | B1* | 8/2001 | Imachi et al. ............... 717/122 |
| 6,308,179 | B1 | 10/2001 | Petersen et al. ............ 707/102 |
| 6,324,551 | B1 | 11/2001 | Lamping et al. ............ 707/500 |
| 6,330,572 | B1* | 12/2001 | Sitka .......................... 707/205 |
| 6,370,538 | B1 | 4/2002 | Lamping et al. ............ 707/102 |
| 6,370,553 | B1 | 4/2002 | Edwards et al. ............ 707/514 |
| 6,397,231 | B1 | 5/2002 | Salisbury et al. ........... 707/515 |
| 6,401,239 | B1* | 6/2002 | Miron ......................... 707/203 |
| 6,421,700 | B1 | 7/2002 | Holmes et al. ............. 709/100 |
| 6,430,575 | B1 | 8/2002 | Dourish et al. ............. 707/200 |
| 6,493,731 | B1 | 12/2002 | Jones et al. ............... 707/501.1 |
| 6,505,219 | B1 | 1/2003 | MacLean et al. ........... 707/530 |
| 6,562,076 | B2 | 5/2003 | Edwards et al. ............ 715/515 |
| 6,647,391 | B1 | 11/2003 | Smith et al. ................ 707/100 |
| 6,741,996 | B1* | 5/2004 | Brechner et al. ........... 707/102 |
| 6,928,447 | B2* | 8/2005 | Kaler et al. ................. 707/101 |
| 2002/0055958 | A1 | 5/2002 | Edwards et al. ............ 707/514 |
| 2002/0078117 | A1 | 6/2002 | Wang Baldonado et al. .......................... 709/101 |
| 2003/0149695 | A1* | 8/2003 | Delaire et al. ................ 707/10 |
| 2004/0107314 | A1* | 6/2004 | Kim et al. ................... 711/114 |

* cited by examiner

*Primary Examiner*—John Cottingham
*Assistant Examiner*—Cheryl Lewis
(74) *Attorney, Agent, or Firm*—Mintz, Levin, Cohn, Ferris, Glovsky and Popeo, P.C.

(57) ABSTRACT

A system and method for electronic file management includes an object-oriented file management database, a volume manager, and a coherency manager. The volume manager manages electronic files and metadata relating to the files of one or more volumes. Each volume may include folders, files, and/or other digital content. A user interface facilitates user interaction with the file management system. The user interface enables a user to view and manage, within the file management system, metadata associated with the electronic files by graphically displaying information about the files and the metadata and enabling the user to manipulate the files and the metadata.

28 Claims, 4 Drawing Sheets

GRAPHICAL USER INTERFACE FOR SYSTEM AND METHOD FOR MANAGING CONTENT

CROSS-REFERENCE TO RELATED APPLICATIONS

This application claims priority to U.S. Provisional Application Ser. No. 60/434,418 entitled "FILL MANAGEMENT SYSTEM AND METHOD" which was filed on Dec. 19, 2002, and which is incorporated herein by reference in its entirety. This application is also related to corresponding U.S. patent application Ser. No. 10/630,092 entitled "System and Method for Managing Content;" U.S. patent application Ser. No. 10/632,091 entitled "System and Method for Managing Content Including Content Addressability Features;" U.S. patent application Ser. No. 10/632,091 entitled "System and Method for Managing Versions" and U.S. patent application Ser. No. 10/632,086 entitled "System and Method for Managing Content With Event Driven Actions to Facilitate Workflow and Other Features," each of which is incorporated herein by reference in its entirety.

FIELD OF THE INVENTION

The present invention relates to an integrated system and method for managing files, messages and other digital content that facilitates categorization of information, provides version control, allows event-driven actions including control of work flow, permits sharing and access control of files, is transactionally-based to permit easy historical viewing and undoing of a wide variety of changes to files and folders and other features, and a graphical user interface to facilitate access to and use of such a system.

BACKGROUND OF THE INVENTION

Computers have revolutionized the storage, retrieval and use of information. As the costs and size of computer memory has gone down, the amount of information accessible to a user has increased substantially. The expansion of networks, including global networks, such as the Internet, has also greatly contributed to this growth. This growth has greatly outpaced the ability of existing systems to find, share and organize that information.

Originally, electronic file systems were based upon simple filing concepts from paper files. Files were organized into folders and subfolders, just like documents in filing cabinets. As the number and types of files have grown, the inadequacies of the early systems have become increasingly apparent. In the physical environment, as the number of filing cabinets increased, indexing systems were developed to locate specific files or documents. Such systems are still used in controlling physical documents. In the electronic realm, similar file management systems have also developed. However, networks have changed the nature of file storage. A user is no longer limited to the files on a single computer. Instead, a single user can create, store, access, modify and copy files on any number of machines, including their own computer, network servers, and even co-workers computers. Additionally, others on a network may be creating, copying, and modifying those same files. The exploding use of email has also contributed to current problems. Emails are also retained and they need to be organized and controlled, so that they can be later located, accessed and used. Within existing computer filing systems, disorganization is rampant, and it can be hard to find things. In recent years, various disparate applications have emerged to solve some aspects of the problems: Version Control systems, Document Management systems, Workflow systems, Configuration Management systems, Archiving systems, Backup systems, general purpose databases, etc. These applications are yet other places to store files, in systems that have to be learned, maintained, backed up, etc.

One of the many problems with existing electronic filing systems is the creation of copies. It is very easy to copy a file. There are also important reasons why a copy of a file may be better than the original, in terms of accessibility and convenience. However, the creation of many copies further increases the disorganization of filing systems. Studies have shown that most of the files on people's computers and disks are copies of files from other computers on the network, from read-only media, and from their own computer.

The creation of copies can be very confusing. The original file may be changed, or the copy may be changed. Then, they are no longer exact copies, but a user can easily lose track of which is the correct one. Many times the creator of a copy forgets about it or why it was created. The copy then continues to exist, using valuable storage and name space, but without any purpose. The vast majority of copies are not necessary. Therefore, a need exists for a file management system with improved performance such that the need for copies is limited. Furthermore, a need exists for a file management system that maintains information about copies of files so that its use and relationship to other files can be easily determined.

Another problem with current file systems is that different users may use different approaches to file organization. This leads to difficulties in finding and sharing files. Another problem is the way that access control and sharing are managed. The sharing and access control features in the Windows™ operating system, for example, are very difficult for the average user to make sense of, to use and to maintain. An advanced user is typically needed to establish and maintain file sharing groups and related mechanisms. Improper sharing and access control may allow access to information that should not be disclosed, or files may be inaccessible that should be shared. Therefore, a need exists for a file management system that allows simple control of access control and file sharing.

Locating a desired file is another complicated process in existing systems. Each computer or disk drive is often searched separately, even though information may be stored on several different, interconnected, computers. Even if a search looks for a file on multiple computers, the search results can be misleading or incomplete. The problems with copies may mean that a search may produce many duplicate results and results that do not include the best version. The system provides little, if any, assistance in determining which is the proper (e.g. current) file. Therefore, a need exists for a file management system that allows searching on multiple computers and organizes results in a useful manner.

It is well known that it is advisable to maintain backup copies of files in case of corruption, loss, or other problems. However, there are numerous problems with backup systems. Often, backup systems are not installed or operated on a regular basis. Sometimes, backups do not succeed when scheduled. Very often, only essential servers are backed up, the files on individual computers typically are not regularly backed up. Additionally, locating and retrieving a backup file can be difficult. Therefore, a need exists for a file management system that simplifies the backup and restoration processes. Other drawbacks exist.

SUMMARY OF THE INVENTION

An object to the invention is to overcome these and other drawbacks. The present invention substantially overcomes the deficiencies of the prior art through a novel file management system. According to one aspect of the invention, the file management system includes an object oriented file management database. The file management system includes a volume manager and a coherency manager. The volume manager manages a set of volumes. Each volume may include folders, files and other digital content, and it may reference other volumes. The coherency manager, among other things, facilitates consistency among multiple volume managers. According to another aspect of the invention, a novel user interface for interacting with the file management system is provided.

Unlike conventional file management systems, the file management system of the present invention is content addressable and self-organizing to facilitate categorization of information, includes a publish/subscribe capability and event-driven actions to facilitate sharing and access control of files and workflow, is transactionally-based to facilitate the ability to enable a historical view showing actions performed on that file or folder and restoring files and folder to states prior to a change. As detailed below, these and other aspects of the invention enable a number of advantageous features.

According to one embodiment, implementation of the content addressability feature includes the use of tags. Tags are name-value pairs that describe folder or file attributes. Tags can have a single value or, in some cases, multiple values. According to one aspect of the invention, some tags may be system generated tags and others may be user selected tags. Via the user interface, for example, by right clicking on a file or folder and selecting tags from a menu, a user can open a Window showing the item's tag information and can view and/or change tag information.

According to another aspect of the invention, each volume can include one or more folders. A folder may be configured to be a view of the database and include pointers to the files associated with that view. This enables the contents of a folder to be constructed and maintained dynamically. According to another aspect of the invention, various folder types may be used. By way of example, the folder types may include one or more of a query folder, a search folder, a merge folder, a magnetic folder, a typed folder and other types of folders.

A query folder is a folder that generates a query (e.g., based on the folder name or based on a tag attached to the folder, or otherwise) into the file management database. A query folder encapsulates a set of search criteria and includes real-time-updated results of the search. If a file is later changed so that it matches the query, it will be added to the corresponding query folder. Similarly, if a file is later changed so that it no longer matches the query, it will be removed. The search can be a full-text search across one or more volumes, or it can be a tag search, where the query searches tags that have certain values. Other search techniques may also be used. Matching objects are then associated with that query folder.

A search folder is a folder that has associated with it search criteria for searching contents of files or other digital objects. Matching objects are then associated with that search folder. According to one aspect of the invention the volume manager supports integration with free-text search software. When any application changes the contents of a file (or folder), the normal sequence is for the file to be opened, written to, and then closed. The volume manager processes each of these requests. When it determines that a file has changed, a sequence of actions is processed. One of these actions can include queuing the file to a search engine for indexing. In a similar way, immediately after a file is erased, a request to remove the file from the index is queued to the search engine.

According to one embodiment, the system recognizes folders with specially formed names, or with special tags, as being search folders or query folders. When such a folder is recognized, a search string is extracted from the folder name or from specific tags, and passed to a search engine. The results of the search are shown as familiar files-in-folders. If the search query is presented in the form of a folder name or a tag value, it is persistent. The search strings can include complex search expressions, including boolean operations. When a file is created or is changed so that it matches an active search folder, the name of the file will appear in that folder without any additional intervention by the user. Files can also be specially marked to prevent indexing. Other aspects of searching are facilitated by the invention.

A merge folder is a folder (or overlay) that combines two or more folders (e.g., using boolean logic or otherwise). A merge folder can include items from a 'merge list' of other folders. An item in a folder in the merge list hides a like-named item in a folder farther down in the merge list. According to one embodiment, the merge is real-time, not a snapshot. As items appear and disappear in the merged folders, they appear and disappear in the merge folder contents. A merge folder can be configured to allow creation of new items in the first folder in the merge list, and it can be configured to allow the system to delete items from where they reside or merely to hide them from appearing in the merge folder. Items from the source folders can appear in the merge folder as sync links. Preferably, the system uses a combination of query folders and merge folders to implement one form of complex queries.

A magnetic folder "attracts" files with certain tag values. For example, magnetic folders disable automatic removal if a file ever matches a query or other criteria.

Typed folders are folders that include files or other content that have certain characteristics. For example, a typed folder can limit what types of files can be located in the folder (e.g., only PDF files), it can prevent certain types of files from being located in the folder and can require certain content. For example, a 'Group Role' folder can be allowed to include only 'User' files and 'Group Access' folders.

According to another aspect of the invention, changes to folders and files are handled on a transactional basis. This enables the system to retain information regarding the creation, modification, and uses of a file or its attributes, maintains information regarding relationships between files, controls access to files based upon the stored information and provides other advantages. This aspect of the invention facilitates an item history feature. Each time an item is copied, moved, deleted, saved, renamed, etc., the volume manager keeps a record of one or more of what was done, by whom, when, why and other desired information. This information may be seen by choosing an item (e.g., by right-clicking the item from the user interface) and selecting "Show History." In some embodiments, this brings up a window that shows one or more of where this item was copied from and to, who did it, when, why and other desired information. The Item History for a folder can also include a list of items that used to be in the folder but which were either deleted or moved from the folder. The user can open and explore these items if desired (they will be frozen as discussed below). These items can be selected by selecting 'Undelete' or 'Bring back' from a menu.

An 'undo' option lets a user undo other previous commands. When a user right clicks on a file or folder and selects the 'Undo . . . ' menu item, this brings up a dialog box that describes a list of things done to the item and the option to undo one or more of them. The undo feature applies to whole folder hierarchies as well as to individual or collections of files. Other changes to files and folders can be viewed and undone in accordance with the present invention.

The system further permits a user to select a 'Show versions' menu item. This displays all extant past versions, which are all frozen. The user can drag these versions to somewhere, open them, compare them with other versions, or perform other file operations. They are just files and folders (except they're frozen). To make a previous version become the latest, most current version again, the user can right click on an old version and select the 'Make Current' command. The item will then be reinstated as the current version.

These features facilitate simple tasks like undeleting a file but also provide a broader range of novel features including the ability to undo a renaming of a file or folder and other changes made to the file or folder.

Another feature accessible from the user interface is the ability to freeze files or folders. When a file is frozen, both the contents of the file and the tags attached to it are made, permanently read-only. A file or a folder and all of its contents (recursively) can be frozen. When this occurs, no one, not even a super-user or administrator can make it modifiable. Yet it can still be read. When an item is frozen, the user can be assured that the item is truly a snapshot taken when it says it was taken and that everything in it is as it was, nothing added, nothing changed, nothing removed.

According to one embodiment, every file has an inspectable cryptographically-strong hash code (using the SHA-1 algorithm, for example). The user interface permits verification so that this hash code can be used to verify that the content really is intact, and that no error or hacking has changed the content. The hash code may also be used for digital signatures.

Another aspect of the invention relates to versioning and saving. The system permits saving a file from an unmodified application, or a user can choose the 'Save as Version' menu item. The 'Save as Version' command takes a snapshot of an item by making a copy of it, freezing the copy so it will never change, and associating it with other past versions of the item. A user can access any past version and copy it, link to it, or move it, but it can't be modified, since it will be frozen. When a snapshot is performed, the volume manager also records who, when, and optionally, why (if a user chooses to supply a comment or have the system do so automatically). Taking a snapshot of a folder is similar except that the volume manager saves a frozen copy of everything under the folder.

Another aspect of the invention relates to event driven actions including triggers and constraints. Anything done to a file or a folder can be an event that can trigger an action. A constraint can be a required event or condition that must occur or exist before a certain action can occur. For example, it can prevent a file from being published before certain approvals are obtained. Numerous other uses exist for triggers and constraints. To use this feature, a user can select from many pre-programmed actions and customizes them with drag and drop and form-fill-in. In some embodiments, actions can be programmed by the user. The combined result of all programmed actions enables the system to react in real time. As an example, the system uses event-driven actions to notify the right people when a work product file is ready for them to review or to use in some other part of a project. Using event-driven actions, a user can build complex workflow automation into folders and files.

Another feature of the user interface is the ability to easily manipulate lists. According to this aspect of the invention, in list view, a user can sort by column as usual, but in addition, can configure any column to show the contents in 'my order'. When the folder display is in this mode, a user can rearrange the order of folder items using drag and drop techniques. The folder subsequently remembers the user's ordering.

Various aspects of the volume manager and coherency manager facilitate various other aspects of the invention. One such aspect of the invention relates to smart copies. The volume manager eliminates many scenarios that would have necessitated making copies. The primary scenario where a true copy is useful is where a user wants to modify one copy in one way and another copy in another way. For these and other reasons, the smart copy feature of the volume manager encompasses several enhancements over traditional file copies. According to one embodiment of this aspect of the invention the system permits live copies, deferred copies and other provides other copy-related benefits.

According this aspect of the invention, when the system makes a live copy of a file named A to a file named B it makes both A and B refer to the same underlying file. If a user modifies file A, file B reflects the change immediately. Deleting file A or B has no effect on the other file. If a new version of one file is made, then the other filename will refer to that new version. The coherency manager permits live copies to be on different volumes. Live copies can refer to folders as well as files.

The live copy feature facilitates organization of data, in part, because it lets a user put the same file or folder inside more than one folder. For example, a photo can be in both the Yosemite folder and the Jane folder. In reality, the folders each include a reference to the same physical file. So if the photo is changed, the change will be reflected in the "copy" in each folder.

Another aspect of the invention relates to deferred copies. When the system makes a "regular" copy of an original file named A to a copy named B, the volume manager knows that the names refer to copies of the same file. This uses only a small amount of additional disk space. Initially both the original item and the "copy" share the same data. However, at the time that a user modifies either the file called A or the one called B, the volume manager will make a copy of the single underlying file, and each of the two names will refer to its own separate data. This applies to files, folders and other items. In the case of folders, only when files are modified in one or the other copy does the volume manager actually need to allocate space for the new, modified copy.

After copying file A to a new file B, very little additional disk space is needed because of the deferred copy feature. File A will remember that it was copied to file B, and file B will remember that it was copied from file A. This information can be seen in the user interface and it can be used to navigate from one copy to another. File A and file B share the same list of previous versions. If we modify A and then also modify B, the current versions will differ, but both still share all of the same previous versions. Normally, when a file is copied, the copy is associated with the same current version and all the same previous versions. But if desired, a user can copy a past version of A to a new file C, and then modify C. Now A and C differ, but the ancestry they share is the same up to the point where the copy was made.

Another aspect of the invention relates to smart links. Windows has shortcut files. Mac OS has alias files. Unix has symbolic links and hard links. The invention supports these features and more. A link is a reference to whatever is at the end of the given path. The path can be relative, absolute, or it can be a URL. With adequate permissions, a user can make the link "sticky." A sticky link gets to dictate attributes of what it points to: the file type (such as a PDF file), whether there has to always be something there at the end of the path, and whether the link will adjust to point to the new location if the reference moves. A link can be configured to behave like a Mac OS alias, Windows shortcut, or Unix symbolic link or hard link, appropriate to the platform from which it is accessed. A link can also be configured to keep a cached copy of whatever was there the last time the link was used. The link might include a cached copy of a remote web page or a folder on a remote web site, for example.

Another aspect of the invention relates to a smart caching feature. When a user accesses volume A on server X from client machine Y, the volume manager on machine Y creates an entry for volume A in its local disk cache. From then on, even if the user disconnects from server X, he can still work on volume A from their client machine Y, using whatever is cached locally. Preferably, the user can request that certain files from volume A will always be cached on their client machine, in case they disconnect or in case the server goes down. To do this, the user can select an item on volume A, right click, and then select the 'Keep local' menu item from a pop-up menu. If the user sets 'Keep local' on a folder, all of that folder's contents, recursively, are affected. If the user also wants to protect against the item being deleted, the system can make a Live Copy.

The volume manager on client machine Y works unobtrusively in the background to ensure that 'keep local' items remain in sync with the server. If the user disconnects Y from the network then reconnects, the volume manager will synchronize the cache with the server. If the user made any changes in the local cache while disconnected, there may be conflicts with changes on the server. In this case, the user interface will help the user reconcile differences. The user interface's compare-merge tools facilitate this.

Another aspect of the invention relates to a smart back up feature. The volume manager handles backups in an automated way. As files are changed, they are sent over the network to another machine running a copy of the volume manager, which has been designated as the 'backup server'. The versioning features make a volume an ideal store for backups because it has adequate expressive power to accurately represent the history of the backed-up data. Also, the system's transactional characteristics are ideal for backup because the backup can be guaranteed to be a consistent snapshot.

Backups happen continuously, slowing down only when there's nothing to do or to get out of the way while a user is using his computer. Whenever there is idle time, at night, at lunch, while a user is on the phone, backups can go at full speed.

To arrange for backup of a folder, the user right-clicks on the folder and selects the "Backup . . . " menu item. The user then designates a folder on another volume where he wants there to be a redundant copy of this folder and its versions from now on. Features in the user interface will assist the user in locating a volume manager on their network that is an appropriate receptacle for their backups. Such a machine would often be (but does not have to be) a dedicated, unattended server (called a 'backup drone'), shared by multiple users. The user interface will also help the user identify an appropriate place to store their files on the backup machine. For example, there could be a specific part of the backup machine's folder hierarchy that has been designated for backups. Typically, the folder being backed up will be the root folder of a volume. The backup drone will generally be up and connected 24×7. It may have RAID disks, it may be a member of a Cluster, and it may in turn back up to another drone off-site.

Backups are useful for at least two classes of problems: disaster recovery and undo. Disaster recovery is easily handled by copying an entire folder or volume from backup as of the most recent backup. Undo allows a user to retrieve deleted items and past versions of modified items. As discussed earlier, undo of recent deletions and modifications doesn't require backup, since the volume manager keeps recent versions on the local disk. Eventually, however, enough old versions may accumulate on the local disk that the volume manager will need to delete some of them, counting on a backup volume to supply the data if it's needed. If an undo involves data that has been deleted from the local volume, the user interface transparently retrieves the needed data from the backup volume. The undo operation is a little slower, but otherwise operates similarly.

As can be seen, these various features, functioning together, permit great synergy and provide unique functionality not heretofore believed to be known. By way of example, the freezing feature is particularly beneficial to reliably storing past versions. The deferred copies feature makes the folder snapshot feature practical because it requires minimal disk space. Another useful versioning feature is the ability to view a folder hierarchy or an entire volume as of a given time. This 'as of' view uses frozen items. Various other synergies exist.

DETAILED DESCRIPTION

Figure 1:
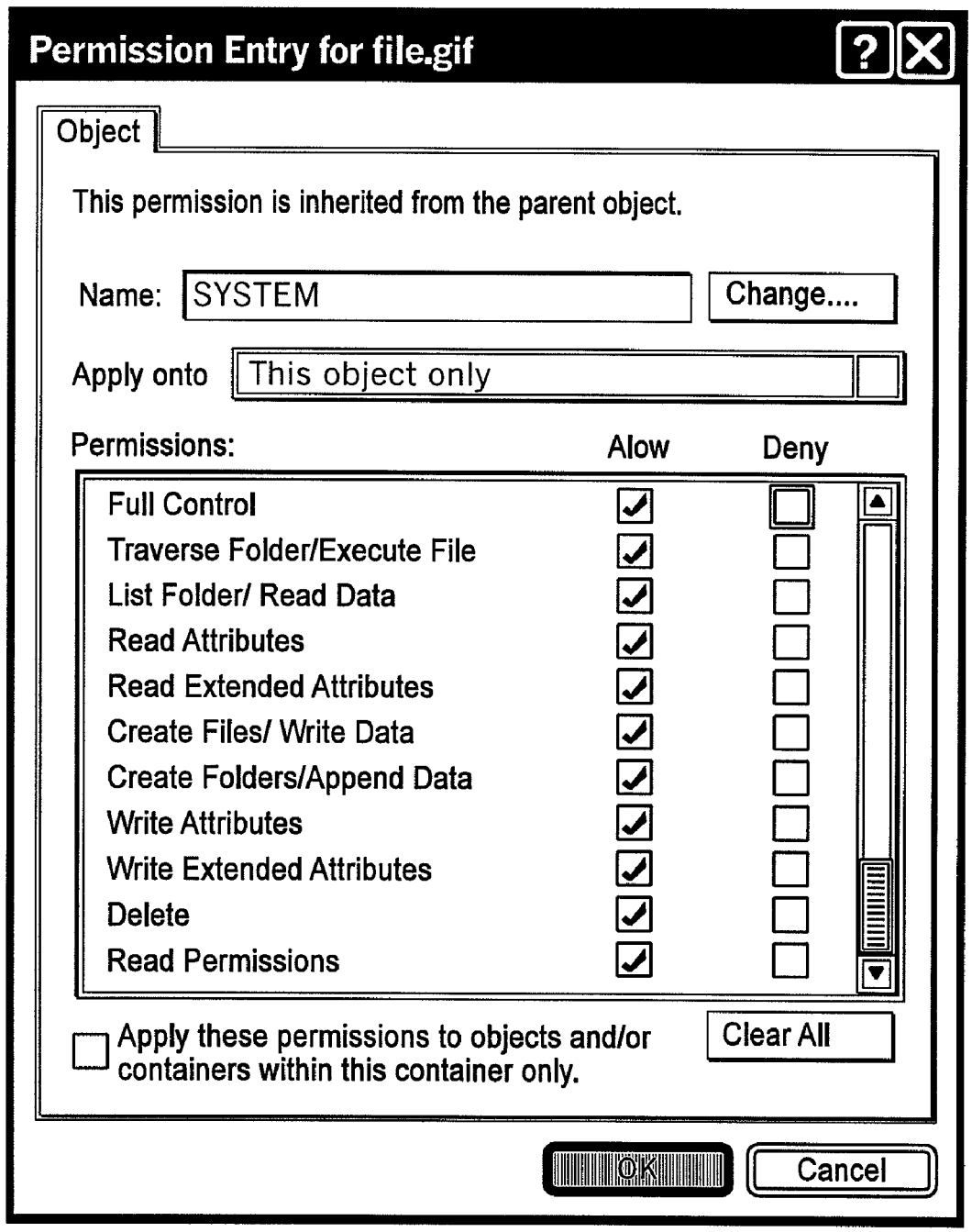
FIG. 1 illustrates complexity in access control associated with a conventional system.
Figure 2:
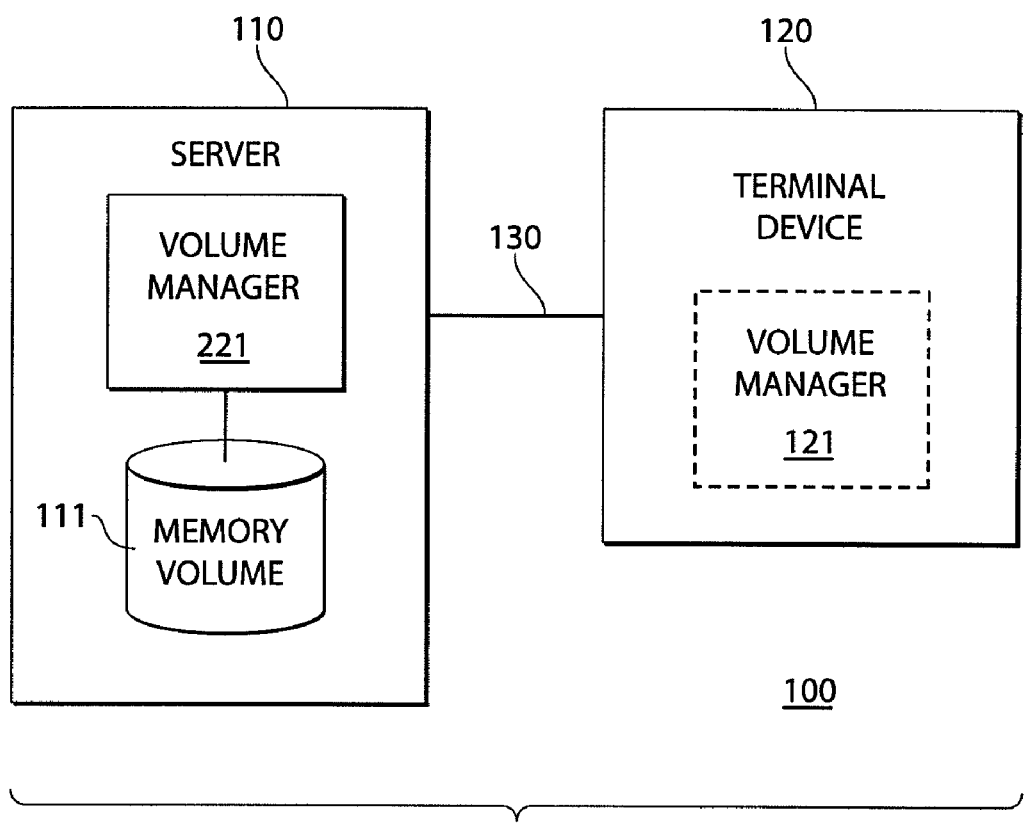
FIG. 2 illustrates a server system that can utilize a file management system according to an embodiment of the present invention.

FIG. 2 illustrates a computer system 100 to which the file management system of the present invention can be applied. As illustrated in FIG. 2, the computer system 100 includes a server 110 and a terminal device 120. The terminal device 120 may be a computer. Alternatively, it may be any other device which can communicate with the server in order to access files, such as a PDA, a MP3 player, a cellular phone, a electronic gaming system, etc. The server 110 includes at least one memory volume 111 and at least one volume manager 221. The terminal device 120 is connected to the server 110 by wired or wireless communication link 130 in order to access data on the server 110. The communication line 130 connects to the volume manager 221 in order to access the memory volume 111 on the server. Alternatively, the terminal device 120 may include its own volume manager 121 for directly accessing the memory volume 111 on the server 110. Preferably, the volume manager 221 is a software application operating on the CPU of the server which provides functionality as discussed below. Alternatively, the volume manager 221 may be implemented in hardware or operate on a machine separate from that having the memory.

Figure 3:
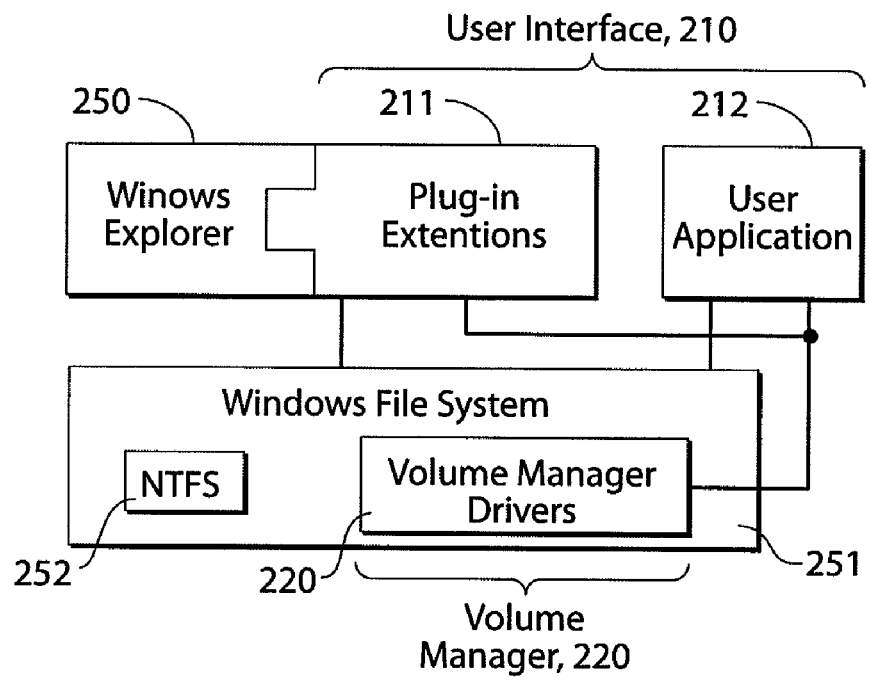
FIG. 3 illustrates various components of a file management system according to an embodiment of the present invention.

FIG. 3 illustrates components of a software application providing the functionality of the file management system according to an embodiment of the present invention. The file management system includes a user interface 210, a volume manager 220 and a coherency manager module. Other software modules may be used and functionality described herein as being performed by one module may in some cases be performed in whole or in part by another module. The various software modules may be installed on each computer or other device which utilizes the file management system of the present invention and on one or more servers or central computers. These software modules may operate in con unction with existing software on those machines. In particular, the user interface 210 and the volume manager 220 function in connection with the existing file system on the computer, for example, a Windows file system 251. The user interface 210 includes at least one of two alternative components: a set of plug-in extensions 211 to Windows Explorer 250 (or other such application) and a separate user interface application 212. The plug-in extensions 211 allow users to access the functionality of the novel file management system utilizing familiar formats and displays (e.g., within a Windows Explorer or other environment). The user interface application 212 provides an alternative interface and may include additional functionality. Also, the user interface application can be used for devices which do not include Windows Explorer.

In one embodiment, a volume is a unit of file storage typically associated with a disk partition, or with a Windows 'drive letter'. This embodiment utilizes specific memory volumes created for use with the file management system. In some embodiments of the invention, a memory volume 111 within the present invention can be a physical volume, residing on a disk partition initialized for use with the file management system. In other embodiments, memory volume 111 may be a virtual volume whose data is stored inside a hidden folder on an existing OS volume, such as NTFS 252 in a Windows file system 251. The volume manager 221 manages the contents of one or more memory volumes 111.

Figure 4:
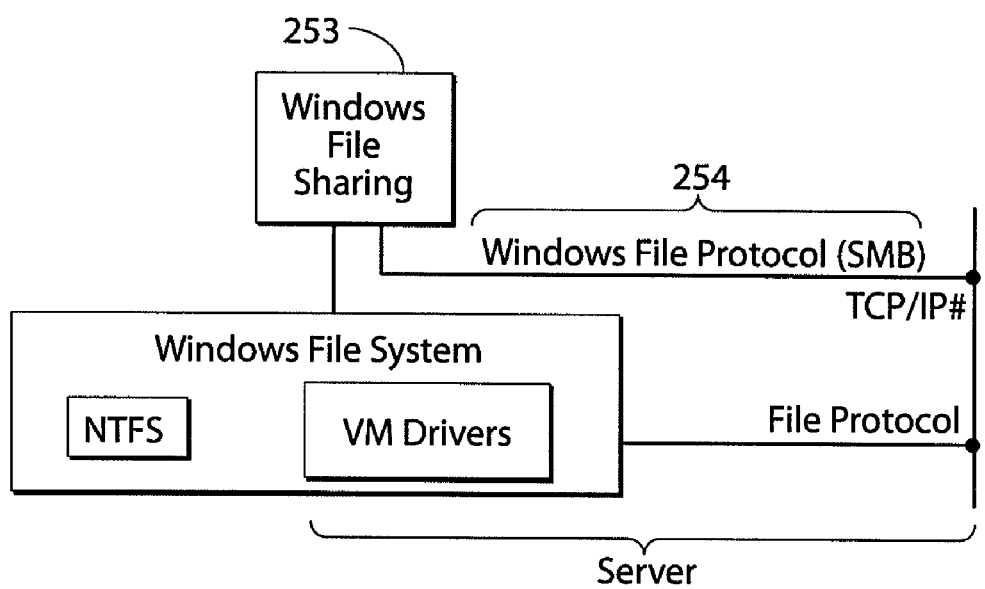
FIG. 4 illustrates communications in a file management system according to an embodiment of the present invention.

The volume manager 221 may be enabled for network access. A proprietary protocol is used to communicate with the volume manager 221. FIG. 4 illustrates the components of a file management system enabled for network access. A TCP/IP connection is used to communicate with the various components operating on the memory. The volume manager 221 connects to a client over a TCP/IP connection, using a unique file protocol. A Windows file protocol 254 may be used to communicate with a Windows file sharing application 253 for control of data not within the file management system of the present invention. The protocol may be implemented in Extended Markup Language (XML), with variations and enhancements that include HTTP, Java Remote Method Invocation (RMI) and raw binary streams. The protocol stream may be compressed and/or encrypted. A group of servers may be used to replicate the same data and appear to users as a single server, to provide high availability and improved throughput.

The volume manager 221 operates on the memory volume 111 to provide certain functionality. The user interface 210 allows a user to access the functionality. The volume manger 221 is able to provide the functionality through specific control of information in the database relating to the memory volume 111 and through synchronization and linking processes. The functionality of the volume manager 221 is described below.

According to one embodiment, the volume manager 221 may create live copies of files. A file named A can be live copied to a file named B, and then either file A or file B can be live copied again to a file named C. The underlying data referenced by the three different filenames is the same. So a change to any one of the files will result in those changes being immediately visible through any of the live copies. However, deletion of one copy does not delete any other copies. The live copies are associated in the database of the volume manager 221.

According to one embodiment, the live copies can be located in different folders. Thus, multiple copies of files can be organized in different manners while maintaining the same content. Since all files are managed by the volume manager 221, live copies also can be located in different volumes. Additionally, live copies are not limited to files. Folders may also be live copies. A folder named X can be live copied to folder named Y. Thus, folder X and folder Y would reference the same underlying data object. This has the effect that changes to folder X would immediately become visible through folder Y. This includes adding pew files to the folder, renaming files included in the folder, or deleting files from the folder.

The volume manager 221 saves disk space and gains performance by utilizing deferred copies. According to one embodiment, when a "regular" copy is made of a file or folder, the file or folder's contents are not immediately duplicated. Only a small amount of additional disk space is needed for the information in the database regarding the new files or folders. Both copies share the same data. Only after the data in one of the files is modified, does the volume manager 221 create separate data. The same applies to copies of an entire folder hierarchy: only when files are modified in one or the other copy does the volume manager 221 actually allocate space for the new, modified copy.

According to one embodiment, the user interface 210 can be used to tell the volume manager 221 to freeze a file. Once a file or folder is frozen, no one, not even a super-user or administrator, can modify or change the state of that file or folder. Thus, frozen files provide a snapshot of the file as of the indicated time. Furthermore, every file, including those that are frozen, has an inspectable cryptographically-strong hash code (using the SHA-1 hash algorithm, for ex ample). The hash code can be used to verify that the content really is intact, and that no error or hackery has changed the content. The hash code may also be used for digital signatures.

A file's hash code can also be used to identity identical content. According to one embodiment, the volume manager may identify files with identical content, and link them together as deferred copies, thereby allowing the duplicate disk space to be freed.

According to one embodiment, the frozen file feature provides a simple mechanism to maintain prior versions of files. Utilizing a version save command in the user interface 210, a deferred copy of the file is created and frozen so it will never change. The frozen file is then identified in the database as a past version of the file. A past version of a file can be accessed to copy, link to or move it. However, it cannot be modified. When a version is saved, the volume manager 221 may also store additional information about the version, such as when and by whom it was saved. Also, comments about the version can be entered and saved by the volume manager 221. In a similar manner, a folder can also be saved, which preserves a frozen copy of everything in the folder.

Because information about associated files, such as versions, is stored in the database, accessing associated files is simple. A "show versions" option can be selected in the user interface 210. In some embodiments, a window will then display all extant past versions, which are all frozen. Any of the prior versions can be moved, opened, compared to other versions, or otherwise manipulated without changing the content of the version. Since information is stored about the timing of versions of all files, the volume manager 221 can provide a view of a folder hierarchy or an entire volume as of a given time. All of the parts of that view are prior frozen versions.

A similar information for copies of files may also be maintained. A "show copies" option may be selected from the user interface 210. In some embodiments, a window will then display a copy pedigree for a particular file. Such a copy pedigree may include all predecessor files, all descendant files, or some combination. As with versions, any of the copies can be moved, opened, compared to other copies, or otherwise manipulated without changing the content of the copy. Since information is stored about the timing of copies of all files, the volume manager 221 can provide a view of a folder hierarchy or an entire volume as of a given time. This allows users to view the migration and evolution of a particular file as well as identify the source of the particular file.

Every time changes are made to files, the volume manager 221 records what was done. When a file is copied, moved, deleted, or saved a record is made. The system can then provide a history of any item, which shows where this item was copied from and to, who did it, when, and why. For a folder, the history includes a list of items that used to be in the folder but which were either deleted or moved from the folder. From the history list, items that have been moved or deleted can be restored, brought back to the folder, or copied back to the folder.

The volume manager 221 also provides linking capabilities. A link is a reference to whatever is at the end of the given path. The path can be relative, absolute, or it can be a URL. In some embodiments, a link can be "sticky," in that it dictates attributes of what it points to. For example, the link can include a reference to a file type (such as a PDF file), whether there has to always be something there at the end of the path, and whether the link will adjust to point to the new location if the referent moves. A link can be configured to behave like a Mac OS alias, Windows shortcut, or Unix symbolic link or hard link, appropriate to the platform from which it is accessed. A link can also be configured to keep a cached copy of whatever was there the last time the link was used, for example, a web page or a folder on a web site.

The volume manager 221 also provides functionality with respect to folders. One type of folder implemented by volume manager 221 is a query folder. A query folder can be created which encapsulates a set of search criteria and includes real-time-updated results of the search. The search can be a full-text search across one or more volumes, or it can be a tag search.

Query folders are stored in the volume manager 221 like ordinary folders. However, their uniquely formatted name or a special tag attribute indicates to the system that they are query folders and not regular folders. At the time that a query folder is enumerated, the query is processed, and the selected files are listed as being the content of the folder. In addition, when a new file is created, or when one of the tags associated with the query folder changes, the query is evaluated again, and an event is delivered to the client to indicate that a file should be added to or removed from the query folder.

Another type of folder implemented by volume manager 221 is a merge folder. A merge folder includes items from a 'merge list' of other folders. An item in a folder in the merge list hides a like-named item in a folder farther down in the merge list. The merge is real-time, not a snapshot; as things appear and disappear in the merged folders, they appear and disappear in the merge folder contents. A merge folder can be configured to allow creation of new items in the merge folder so that they reside in the first folder in the merge list. A merge folder can also be configured to allow deletion of items from where they reside or merely to hide them from appearing in the merge folder. Items from the source folders appear in the merge folder as live copies. A combination of query folders and merge folders can be used to implement complex queries.

Merge folders are also stored in the volume manager 221. The underlying "source" folders know about each merge folder they are used by, and are also referenced by the merge folder. This allows the system to propagate changes in the source folder to the merge folder. The system can also warn the user about a potential conflict before a source folder is deleted. The merge folder also includes a list of edits that are applied to each of the source folders. If a file is deleted from a merge folder for example, an edit is stored so that after the contents of all referenced source folders are collected, the edit list is applied, and the deleted file is removed from the enumeration before the final list is passed back to the user interface 210 for display to the user.

One aspect of the invention provides version control. A folder can be designated as a "Repository." In one embodiment, a repository folder requires that changes be made by doing a "drag-update" to the top-level repository folder itself—other changes to its contents (i.e., a piece at a time) are not allowed. To "check out a copy," a user makes a "regular" copy of the repository folder. Because of deferred copies, this operation is very fast. Users make whatever changes they need to make anywhere within in the copy of folder. Then the copied folder is dragged and dropped; back to the repository folder. The user interface pops up a "check in" window that asks the user to include a note about the changes that were made. During the check-in process, the volume manager compares the version history of the new files with the versions that are already in the repository. This comparison allows it to identify conflicts. The user interface compare-and-merge tools are used to resolve any conflicts that may have arisen as a result of another user checking out the same hierarchy and changing any of the same files.

The file management system of the present invention allows folders, as well as files, to have type. The type is stored in the database with the appropriate folder information. A type can configure a folder to limit what can be in it and to optionally require certain contents. For example, a 'Group Role' folder is allowed to include only 'User' files and 'Group Access' folders, as discussed below.

The listing of items in a folder is greatly enhanced by the file management system of the present invention. Any of the additional information stored with respect to files can be saved. Furthermore, special orderings of files can be used in displaying a list. The items in folders can be sorted by their name, size, modify time and certain other information, as in most file management systems. However, the user can also configure the user interface 210 to display tag names and values associated with the files in a folder. When the folder display is in this mode, the tags appear as column headings, and the tag values appear in those columns. The files can then be sorted based on those tag values, by clicking on the tag name at the top of the column. This is implemented in the user interface 210 as an extension to Windows Explorer known as a "Namespace Extension." The extension is told the name of the folder that it should display. It then sends a request to the volume manager 221 for a list of all of the tags used in that folder, and the value of each tag for every file in the folder. It uses that information to render the user interface 210 as described above.

The system can also display the date and time when an item was added to a folder, not just when it was created.

When applied on a network, the file management system is able to cache files for improved access while maintaining control. When a server volume is accessed, the volume manager 221 on the client creates an entry for the server volume in its local disk cache. From then on, even if disconnected from the server, the client can change anything that appears to be on the server volume, using whatever is cached locally. The system can also ensure that certain files from the server volume are always cached on the client, in case the client is disconnected or the server goes down. If a user wished to always have an item available, the "keep local" option is selected from the user interface 210. For a folder, all of that folder's contents, recursively, are affected when the "keep local" option is selected. If a user also wants to protect against the item being deleted, they should make a live copy. The client volume manager and the server volume manager work unobtrusively in the background together with the coherency manager to ensure that 'keep local' items remain in sync with the server. If the client is disconnected from the network, the coherency manager will orchestrate synchronization of the volume manager with the client cache upon reconnection. If changes have been made in the local cache while disconnected, there may be conflicts with changes on the server. In this case, the user interface 210 will work with the user to reconcile the differences. This is done in part through a set of compare-merge tools that are integrated into the user interface 210. These tools allow the user to visualize the changes, and to either select the right version or merge changes from one file into another.

Since information about all changes to files and folders is maintained by the volume manager 221, undoing actions is fairly simple. The "Undelete" option in the user interface 210 first provides a listing of deleted items. While files are still deleted, they can't be viewed or modified. When the desired file or folder is selected, the undelete command from the user interface 210 makes it viewable and modifiable; again. Similarly, the same process can be used to reinstate a previous version of a file from a version listing. Also, the various actions taken with respect to a file or folder can be viewed and be reversed with the "undo" option.

Any change to a file or a folder is an event that can trigger another action by the file management system. Many pre-programmed actions can be selected and customized with drag and drop and form-fill-in actions. Actions can also be programmed as one would in a spreadsheet, using JavaScript, Java, or Visual Basic. The system can react in real time, similar to a recalculation of a spreadsheet when a cell is changed.

In some embodiments of the invention, every item in the memory volume has tags. A tag is a coupling of a tag type and a tag value. There are many built-in tag types, such as text, user, date, and icon. A tag can be added to an item, perhaps creating a new tag type in the process, and its value can be modified (except for some built-in "system" tags).

An email integration package allows email messages to be brought into the system to be manipulated as files in folders and also to be associated with files and folders. To determine whether there has been any email discussion about a file, right-click on the file and select the "Messages" command. The user interface will then provide the email history associated with this file. By clicking the "New Message" button on the window toolbar, the user may select the people to whom they want this message to go (the system knows who's participated in the discussion so far). The user's usual email application (such as Microsoft Outlook) opens up with a new message in it, and in the body of the message there is a special URL with a special protocol (such as "itc://") that refers to the file being discussed in the email.

Because the present invention is a peer-to-peer system, any user of the system reading the messages including "itc://" URLs can navigate easily from the message to the referenced file—not a copy, but the identical file in the space shared by the peers.

In fact, the URL in the message refers to a specific version of the file, the version that was current when the email was written. If the URL is opened, the user interface brings up a Windows Explorer window to the folder that includes the file, selects the file, and opens a "choices" window. The choices window offers to show other emails about the file, to show the file as it was when the email was sent, or if the file has been revised since then, the system shows the version history and allows a selection between the URL's version and the current version and offers to show a comparison of the two versions.

The system provides access control through use of management folders. In one embodiment, every volume has a management folder with two subfolders: users and tags. The file management system grants access to an item (file or folder) based on who the user is and the groups to which the user belongs. There are three kinds of typed folders found in the users subfolder: "group", "volume group", and "group from authentication server" (the latter two are subclasses of folder type "group"). These folders can include other group folders and special files of type "user".

The system may rely on one or more designated outside authorities to authenticate users. This authority can be the local computer, a Windows Active Directory server, a Kerberos server, LDAP, etc. For every authentication source, there is a corresponding typed folder of type "volume group." For each user authenticated by that source, there is a corresponding user file in the folder. The user file is an XML file that includes authentication source information and user details, such as full name, phone numbers, etc. For each group maintained by the authentication server, there is a typed folder of type "group from authentication server" in which there are live copies of all the users that are members of the group. For example, if the system has been configured to use the Windows domain Active Directory server called CORPORATE, the users area might include these:

/users/corporate/Ron
/users/corporate/Jane
/users/corporate/Fred
/users/corporate/admin/Fred The /users/corporate/ folder (which is a typed folder of type "group of authenticated users") and everything under it includes information that identify the CORPORATE Windows domain as their source. The /users/corporate/admin/ folder is a typed folder of type "group from authentication server", and the user file Fred in it is a live copy of /users/corporate/Fred (because files represent the same data). A typed folder of type "volume group" is a convenient way to establish groups using the user interface. These groups are known only to the system, not to the authentication source. They can be useful because they allow groups within groups.

An authentication group folder is special in how it treats the user files and group folders included in it, and it allows only those types of items in it. Unlike traditional systems, the present invention allows a group to include other groups as well as users. The live copy feature makes organizing users and groups easy. Each item (folder or file) has one or more owners. An owner is a user or group. An owner is allowed to change access settings for itself and for other users and groups.

The system uses event-driven actions extensively, and custom actions can be established to do simple but powerful things. For example, the system can notify the right people when a work product file is ready for review. Using the event-driven actions, complex workflow automation can be easily built into the user's everyday work area, folders and files.

The system tracks various aspects about the usage of files and folders by users. Furthermore, it can be customized to ask for more specific information. Typical document management systems are limited because they are not able to control the files on users' desktop computers. Users often have to extract files from the document management system onto their desktop computer (thereby out of reach and out of the control of the document management system) and then back into the document management system at some later time. According to one aspect of the invention, files never leave the system.

The present invention eliminates bad copies in a variety of ways. For example, in a conventional system, a user may wish to copy an item from a server or a CD-ROM to the user's local machine. If the user's purpose for making the copy is convenience, the invention provides a sync link from the item on the server to the local volume. If the user's purpose is for speed of access, the invention may provide a cached copy on the local volume. If the user's purpose is to protect against the server going down or the item being deleted from the server or unavailability of the CD-ROM, the invention may provide a live copy of the item on the local volume. If the user's purpose is to have access to the item when not on the network, the invention provides the keep local feature.

In other examples, the user may wish to copy an item from the local machine to the server or a removable disk. If the user's purpose for making the copy is for backup, the invention provides automatic backup to the server. If the user's purpose to publish the item for others to access, the invention provides a live copy on the server and furthermore may provide permissions to control which users have access. If the user's purpose is to capture and maintain a version, the invention provides the snapshot feature.

In other examples, the user may wish to copy an item from one folder to another folder for organizational convenience (i.e., have all related files in one folder). In this case, the invention provides live copies or alternatively, special folders that have links to the various items that should be included therein.

In another example, the user may wish to copy items to a zip file or other archive format for reasons similar to those described above. If the user's purpose is to keep a snapshot of a current version of the items, the invention provides the freeze or save features. If the user's purpose is to send these items to another user, the invention provides a link to the saved version that then can be forwarded to the other user. If the user's purpose is to send these items in a zip format, the invention provides an "extract as . . . " folder feature.

Figure 5:
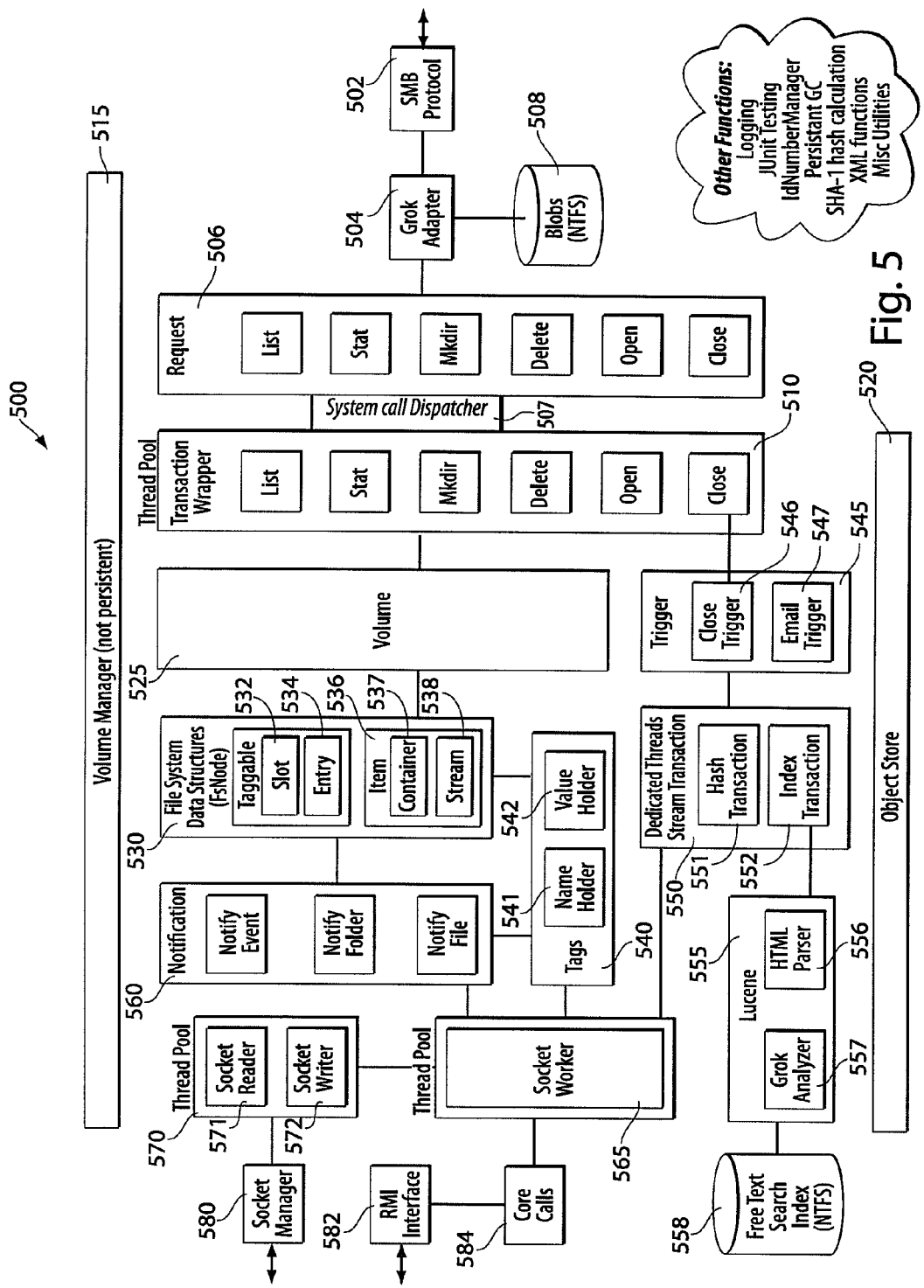
FIG. 5 illustrates a block diagram of a file management system according to an embodiment of the present invention.

FIG. 5 illustrates a block diagram of an embodiment of file management system in further detail. As illustrated therein, file management system 500 interfaces with a file system interface 502. File system interface 502 allows file management system 500 communicate with other system devices (not illustrated) using various protocols. In one embodiment of the present invention an SMB protocol interface box may be used. As is known SMB is a standard protocol used, for example, by Windows to implement file sharing. With the SMB protocol interface box, file management system 500 appears like a network drive to other system devices. As would be apparent, other interfaces could be used including those that would support different file-access protocols or that would allow file management system 500 to appear as a native file system.

File system interface 502 provides a standard API that functions to implement standard file system calls, (e.g., read/write, open, close, etc.). File system interface 502 passes system calls that it receives from other system devices to a disk adapter 504, (sometimes referred to herein elsewhere as a grok adapter) that redirects and implements those system calls in accordance with the present invention.

In one embodiment of the present invention, disk adapter 504 implements system calls or "requests" such as those illustrated in request block 506. These requests include: "list" which is used to enumerate a folder; "stat" which gets information about a particular file such as size, type, etc.; "mkdir" which creates a directory; "delete" which deletes a file, a folder, etc.; "open" which opens or creates a file, and "close" which closes a file. These are referred to herein as file system requests. Other requests such as "read," "write," "seek," etc., may also be included as would be apparent and are referred to as file or "blob" requests. In general, the operation and use of these requests by other system devices are well known.

In one embodiment of the present invention, certain requests and in particular, read and write requests, are actually diverted inside disk adapter 504 directly to streams that exist on an underlying file system 508. In one embodiment, file system 508 is an NTFS-based file system. Other file systems such a FAT file system may be used as would be apparent. However, the NTFS files system provides a more robust system with some built-in integrity preserving capabilities than does FAT file systems. Furthermore, NTFS more readily allows millions of files to be located in a single folder.

When disk adapter 504 detects read or write requests, they are diverted directly to file system 508. In one embodiment, these requests do not pass through the remainder of file management system 500, in part, to avoid processing of large data streams, or "blobs," by a transactional database. However, in other embodiments, for example, in those that implement a custom object store, these blobs may pass through the file management system 500 in order to provide transactional integrity (i.e., all transactions fully complete or fully fail) as will become apparent from the discussion below.

One aspect of file management system 500 is to manage all of the metadata that surrounds that blob as opposed to managing the blob itself. This metadata may include, for example, filename, tags associated with a file, a folder in which the file resides, a time of its creation, a time of its last modification, etc. In some embodiments, file management system 500 may also manage blob creation (e.g., opening a zero length file) and deletion.

When a request from a file system arrives, disk adapter 504 creates a request object that encapsulates any components of the request for operation with a transactional database. In some embodiments of the present invention, this encapsulation allows file management system 500 to be filly asynchronous in that it allows request objects to be queued for subsequent completion without tying up system operation. In some embodiments, disk adapter 504 creates a different request object for each type of incoming request. In one implementation, each request ("list," "stat," "mkdir," etc.) corresponds to a subclass of the base class "request."

For example, a "mkdir" request object would encapsulate all of the parameters for the mkdir request including a name of the directory to be created and a user name associated with the person requesting the creation. The request object is then passed to a system call dispatcher 507. System call dispatcher 507 passes the request object to a thread pool 510 to be executed. Thread pool 510, in turn, wraps each request object or each action associated with the request object inside a transaction for use with the transactional database.

In one embodiment, thread pool 510 includes a parallel set of objects derived from the transaction wrapper. These parallel objects are referred to as task objects. They are derived from another class of objects referred to as a transaction wrapper object. Thus, system call dispatcher 507 passes the request object to the task object which is then handed off to a thread pool to be executed. One aspect of this embodiment is that the task objects may sit in a queue while awaiting processing by thread pool 510. As would be apparent, thread pool 10 also provides a mechanism by which file management system 500 may asynchronously operate, thereby alleviating server overuse and providing improved performance by minimizing connections to the underlying object store.

Thread pool 510 grabs task objects one at a time and calls a run method associated with the task object as would be apparent. This run method within the transaction wrapper handles the object store transactions. More particularly, the run method calls a do_transaction method, which is overridden inside these task objects. In this way, each of task objects does not require all of the external wrapper code that knows how to manage the transactions. The particular task object performs its specific task, (e.g. creates the directory by doing the appropriate object manipulations) and then returns. So the transaction wrapper creates or starts a transaction, calls its specific do transaction method, and then calls the commit transaction routine.

When two tasks or threads attempt to modify the same object(s), the transaction database will detect it and prevent the transaction from succeeding by throwing an exception. The transaction wrapper manages those exceptions, by for example, reattempting the transaction some number of times. In one embodiment, if the transaction continues to fail, the exception manager attempts to obtain exclusive access to the database thereby blocking out any other transactions while it completes the transaction.

Before discussing each of the task objects in further detail, a volume manager object 515 and an object store 520 are described. According to one embodiment of the invention, volume manager object 515 manages much of the non-persistent data that's associated with volume 525, while volume 525 stores the persistent data.

When disk adapter 504 is first initialized, it receives a volume name representing a volume 525 and is instructed to initialize volume 525. Next disk adapter 504 opens volume 525 in similar fashion to a convention file system mount command, by calling volume manager object 515. During this initialization, disk adapter 504 calls a static method inside volume manager object 515 to ask for an instance of volume manager 525 associated with the volume name. The static method either returns an existing volume manager object or creates one and initializes it. If the volume manager object exists, it's just looked up in a hash table by the volume name and returned. If not, the volume manager goes out to the database, establishes a connection to the object store 520 and does a lookup to see if a volume object has been stored there. If it has been stored in object store 520, then that volume object is read in and stored in the volume manager. So where the volume object has been previously created, mounting comprises either reading that volume object or getting a reference to that persistent volume object from the object store and storing a reference to that volume object in the volume manager.

In one embodiment, object store 520 corresponds to an object store. In this embodiment, since each object reference is owned by a particular session, it is not possible to pass a standard reference to an object from one session to another. In this embodiment, object store 520 provides a mechanism referred to as a shared object reference that allows access to these persistent objects with references unique to each session. After the volume manager 515 mounts the volume 525, a reference to the volume 525 is stored in a shared object reference in the volume manager 515.

When the volume object does not already exist in object store 520, volume manager 515 creates volume object 525, causes it to be initialized, and stores it in object store 520. When volume 525 is initialized, a root slot is created along with a root folder and a number of folders and tags associated with a tag volume.

Volume manager object 515 also manages access to sessions of object store 520. In one embodiment, a read/write lock is created and anchored in the volume manager. Any class in file management system 500, for example, transaction wrapper 510, starts a transaction by calling a method in the volume manager to begin the transaction. More particularly, the volume manager includes transaction begin and transaction commit methods. When the transaction begin is called, the volume manager must acquire a read lock before it calls the underlying object store begin transaction method.

A read/write lock provides for multiple readers. So while multiple read locks can be acquired, only one write lock can be acquired. This lock operates as follows. When a write lock acquire is called or issued, it suspends or waits until all read locks have been released. Subsequent read lock acquires that arrive after the write lock acquire is called are suspended until the write lock acquire completes and the write lock release completes.

In one embodiment of the invention, a read lock is acquired in the transaction begin method and the read lock is released in the transaction commit method. In this way, multiple threads and multiple sessions are allowed to be active at the same time. However, to accommodate instances where a write conflict occurs such as described above, retry logic is incorporated into the transaction wrapper. Thus after trying and failing to execute a transaction multiple times, the transaction wrapper calls an exclusive begin method inside the volume manager that calls a write lock acquire on the lock object that's used for the normal transactions. This has the effect of letting all of the normal transactions that are in progress complete, at which point in time, that session gains exclusive access to the database, and it can then complete its transaction without fear of interference from other sessions.

As mentioned above, one embodiment of object store 520 may comprise an object store. In this embodiment, object store 520 stores Java objects in a persistent store on disk using a sophisticated caching and persistence mechanism. Object store 520 allows for multiple sessions with each single session having a consistent view of the database. As a session begins a transaction, object store 520 creates a snapshot of the database that remains consistent until the end of that transaction. When the transaction commits, all of the objects changed by the transaction are written to the database in an atomic fashion using logging mechanisms for recovery or rolling back.

In one embodiment of the invention, the volume manager provides in general a one-to-one association between threads and sessions. Because each session has a consistent view of the database, it cannot damage some other session.

Most of the task objects discussed above include a path name as an input. One function the file management system 500 performs is to map conventional path names (e.g., c:/folder/subfolder/file.doc, etc.) into database objects of various kinds. The volume manager 515 parses the path name and performs various table lookups to identify a node object. The volume manager begins at a root object anchored in the volume object and "walks" the graph of objects from the root down to the node object. The objects that the volume object is walking through while parsing are illustrated in FIG. 5 as file system data structures 530.

File system data structures 530 derive from a super class called file system node, or FS node, and include a slot object 532, an entry object 534, and an item object 536 that includes a container object 537 and a stream object 538. These objects in file system data structure 530 represent files or other data structures that reside on a physical disk.

Slot object 532 manages a name of a file or a folder. Entry object 534 manages tags and attributes. Tags are described in detail below. Attributes describe whether the file is frozen, read only, etc. Container object 537, which corresponds to folders, manages all of the data structures associated with a folder. Stream object 538, which corresponds to blobs, manages all of the objects or all of the items or all of the pieces of data associated with a blob including, for example, the name of the blob on the native file system.

In one embodiment of the invention, each file or folder corresponds to a triple including a slot 532, an entry 534 and an item 536. More particularly, each file corresponds to a triple of a slot, an entry and a stream 538, while each folder corresponds to a triple of a slot, an entry, and a container 537. The objects forming a triple are linked together in various ways to achieve some of the aspects of the present invention including live copies and deferred copies.

Container 537 allows file management system 500 to map path name components into slots 532. In some embodiments, container 537 also includes information about whether or not deleted files should be shown when the folder is enumerated. In other embodiments, container 527 identifies a type of the folder, for example, whether the folder is a normal folder, a query folder, or a search folder. Container 537 may also include maintenance data that takes a file or folder name and maps it to a slot to facilitate certain types of lookups. Container 537 may also include methods within the container class that, for example, enumerate the folder Stream 538 is relatively simple by comparison to container 537. In one embodiment, stream 538 includes a string that identifies the name of the file on the disk in file system 508 where the actual blob resides. Stream 538 may also include a hash ID. In one embodiment, this is a cryptographically strong hash of the contents of the file. Each time a file is modified, this hash value is recalculated, to allow the tracking of identical files according to the invention.

Entry 534 manages any tags that are attached to a file. Since multiple slots 532 can refer to the same entry 534, the entry object also includes a list of all of the slots 532 referring to that entry 534. This may occur, for instance, with hard links. Entry 534 may also include a reference to the underlying item 536, and references to a revision chain (e.g., the previous version to this one and the next version). According to one embodiment of the invention, each entry 534 lives somewhere on a revision chain—it may be the only object on that chain or one of many. In some embodiments, the revision chain is linear. In other embodiments, the revision chain may include branches that may allow an entry to reside on any number of revision chains. In further embodiments, a similar mechanism may provide for a copy history that records where this entry was copied to, where it was copied from, etc. Each entry 534 may also include one or more attribute flags including a frozen attribute, a repository attribute, a free text indexer attribute, and a read only attribute.

Entry 534 also manages a hash table that maps tag names to their corresponding data structures as will be described in further detail below. Entry 534 may also include methods for manipulating revision lists, for setting tags, for removing tags, for copying tags to another entry, and for updating dynamic folders.

File management system 500 also includes a tag object 540. Tags correspond to a name/value pair that is associated with either a file or a folder. As discussed above, entry 534 is the primary object to which tags are attached. Because both files and folders have an entry object, they can both have tags. According to the invention, tag look-ups are used many different places and for many different reasons in the system. As a result, their implementation required speedy operation. In order to pro vide the necessary speed, in one embodiment of the invention, all tag names are stored in a large bi-directional hash table. In other words, the hash table allows the identification of all objects that have a particular tag associated with them as well as the identification of all tags associated with a particular object.

In one embodiment of the invention, a hash table is anchored in the volume object 525, and is used to look up all tag names. This hash table receives a tag name and returns a single name holder object 541. Name holder 541 includes the name of the tag and a set of all of the associated value holders 542 for that name. Value holder 542 includes the value of the tag. In other words, name holder 541 includes the name of the tag and value holder 542 includes the value of the tag. In one embodiment of the invention, a single name can be associated with many values.

Tags can be attached to either entry objects 536 or slot objects 532. Tags that are attached to an entry object are shared by all slots linked to that entry. When referenced with respect to tags, slots and entries together are referred to as taggable objects. Tags attached to a slot are visible only for that slot. File names, for example, may be stored as slot tags, since they are different for each slot. File type and file size may be stored as entry tags, since they do not change based on the name of the file or the folder in which it is located. Slot tags are identified by the prefix "slot." For example, "slot.name" includes the file name. Most other tag names are attached to entry objects.

Each value holder 542 includes a value and a reference to a collection of taggable objects (entry objects 536 or slot objects 532) that share that same name/value pair. This allows file management system 500, then, to easily and quickly determine which entry or slot object is associated with a particular name/value pair by iterating over the set of value holders held by the name holder. In addition, this allows all of the entry or slot objects that are associated with a particular tag or any value of a particular tag to be determined.

Using these data structures, a given tag name may be associated with multiple tag values at the same time for each entry. For example, while it is intuitive that a name can have one value for one file and a different value for a different file, a single tag name can also have multiple values for the same file.

To accommodate a reverse process, a hash table is anchored in taggable objects, whose keys are tag names, and whose values are sets of value holder objects for each of the values that is referenced by that taggable object. This allows file management system 500 to identify all of the tags that are associated with an entry or slot. More particularly, the value holder object has a reference that points back to its corresponding name holder. So from a taggable object, all of the value holder objects can be determined which provides the values of the tags, and from those, the tag name and other files with the same tag name can also be quickly identified.

In addition to tags, file management system 500 includes mechanisms for causing side effects to normal file system operations. These mechanisms are referred to as triggers. In one embodiment of the invention, a trigger 545 is implemented around various requests. The triggers can be invoked before and/or after each of the various requests, for example, to veto the operation, to indicate or record that the request either is about to happen or just completed, or to cause various more complex actions to take place, such as setting tags or creating new files or performing operations over a network. Triggers may also be invoked if changes are made to various tags, either globally (regardless of the file to which the tag is attached) or locally (only when the tag is attached to a specific file), as would be apparent.

In one embodiment of the invention, trigger 545 includes a close trigger 546 and an email trigger 547. When a file is modified and closed, then close trigger 546 is invoked. When a file is moved from one folder into another, then email trigger 547 is invoked.

In one embodiment of the present invention, when close trigger is invoked, it can call an external program whose purpose is to determine the MIME type of the file. Volume manager 515 makes an initial assumption about the type of the file based on its file extension, based on a list that maps an extension string to a human-readable file type, and another list that maps an extension to a MIME type. However, if a file's extension is not in those lists, the close trigger will call an external program that opens the file, reads the first few bytes, and, based on a set of rules, determines what the MIME type of the file is.

The output of the external program is captured and stored into two tags in the file management system 500 referred to as system tags. System tags differ from other tags in file management system 500 in that they cannot be directly modified by users of file management system 500. According to one embodiment of the invention, system tags start with the keywords "sys," or "slot.sys" for slot tags. Thus, "sys.mime" and "sys.type" include the MIME type information—the actual MIME type is included in sys.mime and a human readable version of the MIME type is included in sys.type. As thus described, these two system tags are determined when the close trigger is invoked.

In some embodiments of the invention, when the close trigger is invoked, a request is queued for a cryptographic hash to be computed for the file. As this computation is both CPU and I/O intensive, it is queued for subsequent background processing so as to not delay the close operation as would be apparent. In one embodiment, a single background thread is used for computing these hashes.

In a similar manner, the close trigger may also queue a request to index the file. Indexing the file facilitates free-text search of the contents of that file. In one embodiment of the invention, file management system 500 integrates with a third-party free-text search engines referred to as Lucene, though other engines could be used as would be apparent. Indexing may also be done by a single background thread.

When an email trigger is invoked, an email may be sent to a user based on various tags that are attached either to a file (for example, to send an email when the file is modified), or that are attached to a particular tag (for example, to send an email when the tag is modified). In some embodiments of the present invention, the contents of the email are static. In other embodiments, the contents are fully configurable based on other tags that could be read either from the file itself or from the tag volume.

When the email trigger is invoked, it evaluates various conditions and determines whether to send an email. For example, if a file is being dragged into a folder, the email trigger may be invoked. The email trigger would determine the parent folder associated with the destination of the file and determine whether the tags on that folder indicate that an email should be sent. If so, in one embodiment of the invention, the email trigger includes code to connect to an email server (whose IP address is specified in a specific tag) and to deliver an email thereto.

Different triggers may be called based on different system events, as have been described. The name of the trigger may be specified in a tag. When the file management system 500 executes the trigger, it dynamically loads the trigger software, and calls it according to a predefined interface. In one embodiment of the invention, the triggers may be Java class files; a Java class loading mechanism is used to load the software; and a Java interface is used to specify the standard calling conventions. For example, a file "file.txt" may have a tag called "trigger.tag.my.tag" set to the value "MyTrigger." In this example, whenever the tag "my.tag" for "file.txt" changes to a new value, file management system 500 loads a Java class called "trigger.MyTrigger" and then uses the "Trigger" interface to invoke that code.

As mentioned above, the invention provides for placing tags on tags. In one embodiment of the invention, this is implemented using a tag volume where all tags in file management system 500 are reflected as folders. In this embodiment, the tag volume itself corresponds to /volume root/tags/ and tags in file management system 500 descend from this folder. For example, if you have a tag referred to as "sys.tag," within the tag volume, it would be reflected in the filesystem as a folder called /volume root/tags/sys/tag. According to one aspect of the invention, "dots" in the tag name are replaced with "slashes" and appended onto a prefix for the tag volume. Each time a new tag is created, a corresponding folder under that prefix is also created.

However, deleting a tag from a file, even if it's the last occurrence of that tag anywhere in the system, does not remove the corresponding folder from the tag volume. This allows users to construct a tag naming convention hierarchy (taxonomy) regardless of whether those tags are used. The notion of applying a tag on a tag, sometimes referred to as meta-tagging, is implemented within this tag folder hierarchy. As discussed above, tags on tags or "metatags" may used to describe various attributes about a tag. In one embodiment of the invention, metatags are applied to the sys.file tag by using the previously described mechanisms to apply tags to the folder that corresponds to the tag in the tag volume. For example, to apply the "tag.type" metatag to the tag called "sys.tag," the folder/volume root/tags/sys/tag would be located or created and the "tag.type" tag would be applied to that folder.

Another aspect of the tag volume is that when a folder is deleted from the tag volume, the corresponding tag will be deleted from every file with which that tag is associated. A similar mechanism may be used to rename tags.

In some embodiments of the invention, attached to the tag nodes in the tag volume is a list in the form of a multi-valued tag. This list includes all of the values that are associated with that multi-valued tag, as well as markers (in the form of other metatags) indicating whether or not additional values are allowed.

File management system 500 includes a stream transaction block 550 that includes a hash transaction object 551 and an index transaction object 552. These objects include requests that are placed on the hash and index queues, respectively, that were described above. These objects and their corresponding queues are persistent to maintain consistency of files and file modifications and to facilitate recovery from server crashes.

In one embodiment of the invention, requests are added onto a queue by one session and pulled from the queue by another session. But as described above, each session has a unique and consistent view of the object store. Thus, one session viewing the queue within the context of an object store transaction does not see another session updating the queue. Once initiated, then, the hash transaction and index transaction objects would not see new requests entering the queue. In some conventional systems, these objects would periodically abort their session thereby updating their view of the object store, in order to see if new requests have arrived. This is a very inefficient solution.

According to one aspect of the invention, this problem is overcome by using a parallel non-persistent semaphore to manage these objects and their respective queues. When volume 525 is mounted as described above, volume 525 determines a number of objects within each queue. For each queue, volume 525 releases a corresponding number of semaphores. As threads may only acquire as many semaphores as have been released, when a thread attempts to acquire a semaphore object and none are available, the thread waits until some other thread releases the corresponding semaphore.

When, for example, a hash transaction thread begins, it first attempts to acquire a semaphore object. If the thread acquires one, it knows that there must be a corresponding object in the persistent queue. The thread may then join an object store session and start an object store transaction. The thread then safely pulls an object off the queue and begins processing it.

Correspondingly, after a new object is placed onto the queue and the corresponding transaction is successfully completed, the thread that placed the object onto the queue releases the corresponding semaphore.

The semaphore mechanism thus described is important because typically, object store 520 does not allow one session to synchronize on objects used by another session for this kind of "thread-to-thread" synchronization. If fact, some object stores throw an exception when that occurs in order to facilitate each session's unique and consistent view of the database.

Once an object is pulled from the queue, hash transaction object 551 reads the corresponding file and passes the data to a routine that computes a hash code. In one embodiment of the invention, this hash code is a SHA-1 hash code implemented in Java as is known.

According to one aspect of the invention, once determined, the resulting 160-bit hash code is encoded into a relatively human-readable character string. In one embodiment, the hash code is encoded into a 35-character string. In this embodiment, every five bits of the 160-bit hash code encoded as an ASCII character. The five bits correspond to a 32 values from the ASCII character set, namely: {0,1,2,3,4,5,6,7,8,9,a,b,c,d,f,g,h,i,j,k,n,p,q,r,s,t,u,v,x,y,z}. As noted, four of the traditional characters from the alphabet were excluded: 1) 'w' because its pronunciation has multiple syllables and thus takes longer to say; 2) 'o' because it is often confused with zero; 3) 'm' because it is confused with 'n'; and 4) 'l' because it is often confused with one. This encoding results in a readily readable string for customer support purposes, for example.

The encoded string is stored into a tag whose name is passed as parameters to the hash transaction object. In one embodiment, this tag is referred to as "sys.hash.sha-1" and a request to recompute the hash code is queued whenever a file is modified.

Index transaction object 552 pulls an object from its queue and constructs a request for an external indexing program 555 to index the corresponding file. In one embodiment, this external indexing program is a third-party software package referred to as Lucene. Other indexing programs are available and could be used as would be apparent. The external indexing program receives the contents of the file and some metadata such as the date the file was modified, for example. In one embodiment of the invention, indexing is performed for only two types of files: text files and HTML files. These files are comprised of a stream of words readily processed by the external indexing program. In other embodiments of the invention, a prefilter first converts binary files (such as, for example, PDF files, Word files, etc.) into a stream of words and then passes the stream onto the external indexing program. In other embodiments of the invention, the external indexing program processes binary files directly as would be apparent.

The external indexing program uses a front-end filter 557, referred to sometimes as a Grok analyzer 557, that performs various pre-processing steps on the stream of words generated from the file being indexed. These steps may include tokenizing the stream (determining where the breaks between words are), removing "'s" (apostrophe-s) from the end of words, removing periods from acronyms, converting words to lower case, removing common "stop" words (such as "a," "the," "and," "or," etc.) and performing standard Porter stem filtering (removing common suffixes such as "-ing," "-ed," etc., and mapping double suffixes to single ones "-ize" plus "-ation" maps to "-ize") etc.

In one embodiment, the resulting text index files from the external indexing program are stored out in a file system 558 (or files system 508 as would be apparent). Accordingly, in this embodiment, these text index files are not transactionally secure. In other embodiments, the resulting text index files are stored in object store 520 as would be apparent.

File management system 500 also includes a socket manager 580 that is responsible for managing incoming connections used as pathways to execute other remote commands including XML commands and RMI commands. This mechanism provides a parallel or alternate command path to file management system 500 similar to that described as system operations through file system interface 502. Socket manager 580 is to handle XML commands. When a client attempts to connect to the server on a specific port, socket manager 580 receives that connection. Socket manager 580 manages the number of connections, creates socket reader object 571 and socket writer object 572, and delegates subsequent read and write operations to the corresponding object. In one embodiment, these sockets are full duplex, thereby enabling parallel reading and writing as would be apparent.

Socket reader object 571 reads the socket, packages each XML command packet, attaches it to an object, and places that object onto a queue. Socket writer object 572, on the other hand, reads a queue, serializes those objects from the queue, and outputs them to the output socket.

Socket worker object 565, which run in their own separate thread pools, pull requests off of the corresponding input queue, parses the corresponding XML command, determine a necessary action and in some instances, actually executes many of the tasks associated with these particular commands. More complex commands may be dispatched to appropriate objects that know how to perform those functions.

For example, in one embodiment of the invention, commands to manipulate tags (i.e., getting tags, setting tags, removing tags, etc.) may enter file management system 500 as XML commands via socket worker 565. After parsing the XML command, socket worker performs path name lookups, etc., that may be required to obtain either a slot or an entry object and or to set/remove tags, set/read/remove attributes, etc.

Socket worker 565 is also responsible for constructing an appropriate response to the client for the requested operation. For example if the incoming request asked for all of the tags associated with a particular file, socket worker 565 would first access volume manager 515 and parse the path name associated with the particular file into a slot object. Then, using the slot object, socket worker 565 accesses the corresponding entry object. The entry object includes methods that, for example, determine which tags are associated with that entry object. Using that data, socket worker 565 constructs an XML DOM object, which represents the response. Once constructed, socket worker 565 queues the DOM object up to the corresponding socket writer 572 associated with the client that issued the original request.

In one embodiment, the requests are tagged with ID numbers thereby allowing file management system 500 to operate completely asynchronously. This allows a client to submit many requests, one right after the other, without waiting for the responses to come back. Those requests are then queued and subsequently processed by a pool of socket workers. As the requests are completed (and not necessarily in the order in which they were received) and responses are constructed and placed on the output queue, socket writer 572 sends them out with the same ID marker associated with the original request. The client can then correlate the responses with the requests.

File management system 500 also includes a notification object 560. At various points within the operation of file management system 500, such as when a new file or folder is added or when tags change in certain ways, certain events can be generated. According to one aspect of the invention, these events may generate XML messages that are sent to a client, in some instances, completely asynchronously. In order for the client to indicate its readiness to receive these events, the client sends a specific command referred to as a watch list command. The client collects the names of folders referred to by open windows on the client and forwards that as a watch list to the server. In this way, the server now knows which folders every user has open on every connection on every desktop. Whenever a new file is created, file management system 500 searches the watch lists of open folders to determine if any clients currently have a folder open that includes the newly created file. If so, then a corresponding event is sent asynchronously to all of those clients. According to various aspects of the invention, this mechanism works similarly for regular folders, search folders, and/or query folders. A similar mechanism also works for tags where if a tag is changed on a file that is currently open on a user's desktop, then that user will receive an asynchronous event saying that that tag has been updated.

Events maybe scheduled to occur when, for example, a tag or file is deleted from any one of these open folders, a file is renamed, etc. Various objects in file management system 500 track which socket writer 572 or socket reader 571 corresponds to which user. In other words, within file management system 500 there exists a so-called "back path" from the watch list of open folders to the user. This back path enhances the lookup process, making it extremely fast. In one embodiment, the names of the folders are stored in hash tables with the output being a set of socket readers or socket writers that correspond to that particular user. Once this set is determined, an XML notification message may be constructed and queued for the corresponding socket writer.

File management system 500 also includes an RMI interface 582 that operates in a manner similar to socket manager 580, the difference being no XML in the RMI procedure call. In one embodiment, socket manager 580 and RMI interface 582 share common code (i.e., code exclusive of XML parsing etc.) referred to herein as core calls 584. Core calls 582 correspond to the common operations between the RMI interface and the XML interface.

Other functions that may be included in various embodiments of file management system 500 may include logging, unit testing, miscellaneous utilities, etc. These functions are generally well known and may either be incorporated into the system or integrated therewith as third party tools.

Another function that may be included in file management system 500 is an ID number manager (not illustrated). All file system node objects 530, including slots 532, entry objects 534, streams 538 and containers 537, have associated therewith an ID number. This ID number is unique on a per-volume basis. In some embodiments of the invention, the ID number is used to name the underlying blob on file system 508 that corresponds to this node object. As described above, each stream object 538 refers to a blob on files system 508 that corresponds to that stream, and the name of that blob is the ID number of that object.

In some embodiments of the invention, ID numbers may be used to look up objects by their number, for example, with the free-text search index. When a file is indexed in the free-text search sense, its file name is not stored in the index. Otherwise, any time the file is renamed, it would have to be re-indexed. Instead, the ID number is used as the name of the index. When a lookup is performed during a free-text search, the returned hits include the ID numbers corresponding to the objects that were found. This ID number is used to determine which stream objects and accordingly, which entry objects and which slot objects are implicated. From the slot objects, the name of the object can be determined. Using ID numbers in the index also facilitates a single index file regardless of whether the corresponding file is linked, live copied, a deferred copy, etc., as only one instance of that file resides on the disk and thus having multiple index files is unwarranted.

ID number manager assigns the ID numbers. According to one aspect of the invention, ID numbers are anchored in volume object 525. Because of the manner in which object store 520 operates, if each session were to access the volume object for a new ID number as the objects were created, a significant number of write/write collisions against the volume object would result. Instead, ID number manager operates using a single thread to assign the ID numbers.

At start up, ID number manager requests a block of ID numbers from the volume object and places them one at a time onto a synchronized queue. While this queue is not persistent, the volume number update process is. More particularly, when the ID number manager asks for a block of ID numbers, that request is done in a persistent fashion: the updated volume object is written back to the object store so that the block that was requested is "remembered" if the file management system 500 were to crash. However, the queue in which these objects are placed is not persistent. Instead, the ID number manager writes only so many of the ID numbers, one at a time, to the synchronized queue. Thus, this queue has a limited depth. Furthermore, the ID number manager only has a limited number of these objects that it originally fetched from the volume object.

In some embodiments, the ID number manager writes a few of these ID numbers into this queue and suspends until another thread removes a number from the queue. Threads requesting an ID number in order to create file system objects remove a number from the queue. In order to overcome problems associated with this queue being non-persistent, when the ID number manager has placed all of the ID numbers that it fetched from the volume manager on the queue, the ID number manager requests another block of ID numbers through an object store transaction. In this way, the volume object need only periodically re-persist to disk (i.e., update object store) based on the number of ID numbers fetched at any given time from the volume object.

The tag volume is now described in further detail. As implemented in one embodiment of the invention, tag volume is implemented as a tag folder hierarchy. As described above, tags in file management system 500 are reflected into file system as folder names. This is done be replacing the dots in a tag name with slashes, and then appending the resulting string to the root path of the tag volume. For example, with a tag volume root path of "/volume root/tags/" then a tag referred to as "sys.types" would be reflected in the file system as a folder named "/volume root/tags/sys/types." Furthermore, the folders corresponding to each tag are created at the time that the tags are first created.

As also described above, each tag can have one or more metatags applied to it. One purpose of the metatags is to affect the behavior of the tags to which they are applied. These metatags are now described in further detail.

Each tag may include a type that is enforced at the time that the tag is set. One type of tag is a user type. A tag of user type has a value of the form of domain name/user name. Another type of tag is a date type. A tag of date type has an ISO standard date form. Another type of tag is an icon type. A tag of icon type must include a value that represents the name of an icon file found in the /volume root/tags folder. Another type of tag is a hash type. A tag of hash type has a form of a 35-character long string (for encoded representation of SHA-1 hash code). Another type of tag is a trigger type. A trigger is the name of a Java class that will be verified to ensure sure that it exists, and that it is derived from the right subclass type to be a valid trigger. Another type of tag is a boolean type. A tag of boolean type can only be set to true or false. Other values are not allowed. Another type of tag is an email type. A tag of email type must include a properly formatted e-mail address including a user name and host name. Another type of tag is a password type. A tag of password type has the form of any string, but with the property of returning a string of asterisks (for example) rather than its exact value when the tag is read. Other tags types may exist as would be apparent.

Another metatag that is enforced on the volume manager is one that allows new values to be set. This metatag will not allow new values to be created for that tag. Another metatag records all current and past values for a particular tag. Whenever a new tag value is set to particular tag name, this metatag, referred to as "tag.values" is updated so that it includes a current list of all the values that have ever been applied to that particular tag. This allows users to determine, by browsing the tag volume, which of the values of the tags are actually being used. Tags may also include a default value so that when the tag is set the default is used if no other value is provided. An owner of the tag may also be specified. This maybe used to limit who can add, modify, delete, view, etc., certain tags.

Tags may be assigned to a tag group, for example, by setting the "tag.group" metatag. Tags that have the same value for the "tag.group" metatag are considered to belong to the same tag group. When a single tag that belongs to a particular tag group is applied to a file, all of the other tags in that same tag group are also applied to that file. Similarly, when a tag belonging to a particular tag group is deleted from a file, all of the other tags in that tag group are also deleted. Tags in tag groups are intended to be applied and removed together. In some embodiments, if one tag in a tag group is changed and if any tag in the tag group has a trigger associated with it, the trigger will fire (whereas normally only the trigger associated with the tag that is changed would be fired).

In some embodiments of the invention, a metatag of type trigger may be assigned to a tag in the tag folder hierarchy. As described above, this corresponds to a Java class that gets invoked at various points in the operation of file management system 500. For example, triggers may be attached to file operation including opening, closing, reading, and/or writing of a file. Triggers may also be attached to metadata operations including changing a tag or changing an attribute. In addition, periodic triggers may be invoked as would be apparent, without touching the system in any other way. Triggers may perform any number of operations including sending an e-mail, setting various tags, performing file operations, writing out to a log file, creating a new file based on some event, adjusting and/or modifying file attributes, freezing a file, etc., or any other operation that could be programmed using for example, Java code.

An example of a trigger is now described. One type of trigger contemplated by the invention is referred to as an approval trigger. The approval trigger is set up to fire whenever any approval-related tag changes. The approval trigger sets several approval status tags to indicate who has approved a file and who has not, including the various icon designations. And these tags are then later interpreted by the user interface. This is all done based on a list of required approvers that is also attached to the file. The approval trigger may also send an e-mail if so designated by a tag attached to the file or metatag that attached to one of the tags. The approval tag may also freeze the file if all of the approvers have approved the file if that is designated.

File management system 500 manages a set of approval-based triggers. In some embodiments, this set of triggers is managed on a user-by-user basis, so these tags may all include the security authentication domain and user name of the user who approved the file. For example, one tag associated with the approval might correspond to a date tag with the name "sys.signature.domain.user.date." According to the invention, these tags are applied through a signature XML or RMI call rather than directly by the user. This ensures that a formal approval process is followed, that certain requirements have been met, that the users have been authenticated, etc.

One embodiment of the invention implements four approval-based tags. These include a date tag, a hash code tag associated with the file, a status of the approval (for example, "signed" or "rejected"), and the approver's comments relating to their approval or rejection.

In addition to the approval-based tags, this embodiment may also include a set of tags used to control whether other tags (such as the approval-based tags) are required on all the files that go into a folder. By setting these tags on a folder, then every time a file is created or moved in that folder, file management system 500 will require that the other tags are set; if not, the create or move operation will not be allowed.

Another mechanism exists in file management system 500 similar to the tag volume described above. This mechanism is referred to as a user volume or a user folder hierarchy. As with the tag volume, all users of file management system 500 are reflected into the file system as a directory of their corresponding user IDs. For a user "rick" in domain "grokker," there would be a folder in file system 530 named "/volume root/users/grokker/rick." As described above, any number of tags can be attached to that folder to in effect describe that user. For example, these tags could include a human-friendly user name including a first name and a last name, an e-mail address, a password, a preferred language, as well as authentication tokens and pointers to authentication servers, etc. This folder may be linked to other folders thereby designating groups or roles for permission and access purposes.

File management system 500 as thus described provides a framework for implementing various aspects of the invention that will now be described. The first of these aspects is "live copy" and "smart links." As described above, any file in file system 530 has associated with it a slot 532, an entry 534, and a stream 538. When a live copy or smart link command is issued with respect to this file, the file system creates a second slot 532 that points to the existing entry 534, and thus the same stream 538. As has been described above, slots 532 include name information and entries 534 manage tags, and further, multiple slots 532 can point to a single entry 534. Thus, after the second slot is created, the file system, in effect, manages two names for the same underlying object. The live copy command also attaches a trigger to the second slot. This trigger is fired when the file is opened or closed, and manages the synchronization with remote systems.

A similar mechanism may also be used for smart caching and smart backup. A cache or backup trigger is attached to a file so that when the file is opened or closed, the trigger can access a remote cache, synchronize a local copy, or in the case of a backup, send the modified file off to a backup store.

Deferred copies are implemented using a slot and entry pair. The file system permits more than one slot-entry pair to point to the same underlying item 536. As described above, the slot manages the name (so the underlying item can have multiple names) and the entry manages the tags (implying that the underlying item can have different sets of tags). The deferred copy command creates a second slot-entry pair pointing to the same underlying item. The deferred copy provides extremely fast server side copies of an item because the underlying item (including its associated blob, in the case of a stream) is not copied. When the underlying item is opened for writing or modification, the volume manager detects the multiple entries pointing to the same item and only then is a copy of the underlying item made. At that time, the second slot-entry pair is adjusted to point at the copy as would be apparent.

Identical files are detected using the hash code described above. Whenever a file is modified and closed, a background thread calculates a new hash code for that file. The new hash code is stored in a tag associated with that file. This causes, through a trigger mechanism, file management system 500 to compare the new hash code with the hash codes of other files in the system to identify identical files in the file system. According to one embodiment, the file system objects, namely the slot-entry pairs are rearranged to resemble a deferred copy, and the duplicate blob is removed from disk. Identical files are thus combined thereby freeing disk space.

Frozen files are implemented by attaching a frozen attribute as a boolean field to an entry object associated with the file. Whenever this file is opened, this field is examined to determine the allowed operations. Nothing happens if the file is opened for reading. However, if the file is opened for writing or creating an error will be thrown and that operation will be prevented. In some embodiments, this field may also be examined when tags are set so that tags on a frozen file cannot be modified, added, deleted, etc. In one embodiment of the invention, a frozen file is akin to a permanent read only file, including its tags. In various embodiments of the invention, the only operations allowed on a frozen file are reading and renaming.

Query folders are implemented through query tags attached to the folder. Query tags differ from other tags described above in that they can only be attached to empty folders. When these tags are set, special links are made to all of the files that match the query. These links are updated when either the query tags change or when one of the files matching the query changes.

Search folders are implemented in a similar fashion; however, instead of performing a search using the tag mechanism described above, the search folder utilizes a free-text search engine. As described above, the search engine returns the file ID based on a provided search string and the file ID is used to get the file name.

File versions are created automatically, either when a user does a file create on top of an existing file, or when file management system 500 detects a renaming sequence. For example, Microsoft Word uses a renaming sequence that renames the original file to a backup file and then renames a temporary file to the name of the original file. The file system implements and manages versions by maintaining a linked list of entries with various state bits that control whether or not those entries are shown in directories when the directories are enumerated. When the directory is enumerated, the file system uses these state bits to determine which versions to display based on, for example, user preferences. In one embodiment, older versions of files have an ISO standard date encoded into their names for use and discrimination by other systems, along with the word "version". This encoding also avoids name collisions as: would happen, for example, if all the versions had the same name as the original file. In some embodiments, automatically-created versions can also be renamed with a name chosen by the user.

Copy pedigrees are also implemented by file management system 500. When copies are created using, for example, a server side copy command, the server tracks these copy operations by having each entry object forward point to a collection of other entries that are copies thereof. Likewise, each entry object may also backward point to the entry from which it was copied. File management system 500 responds to appropriate XML and RMI commands to present these copies pedigrees in a user interface in an appropriate form to illustrate the migration of copies from place to place.

Undeleting files is implemented as set forth below. As files are deleted, their corresponding slot objects are renamed and a field in the slot object is set to indicate that the slot has been deleted. When a directory is enumerated, deleted slots are not shown. This process is reversed when a file is undeleted. The field in the slot is unset and the name is changed back to its original value. In an analogous way to versions, deleted filenames are marked with the string "deleted" and the date that the file was deleted. When these files are undeleted, their names are marked with the string "undeleted" and the date that they were undeleted. File management system 500 responds to an appropriate XML or RMI command to toggle a per-user boolean value, managed in container 537, which in turn controls whether the deleted files are shown when the corresponding user enumerates the container. With this field enabled, users can see deleted files in the same context where they were originally located.

Type folders are implemented with a special tag on the folder that file management system 500 examines prior to allowing a file to be added there. If the file does not match the specified type, the system will not allow the file to be placed in that folder.

What is claimed is:

1. A computerized file management system for use with an existing file system, that includes a volume, and for managing electronic files on the volume, the file management system comprising:

a volume manager configured to manage the electronic files and to manage metadata relating to the electronic files, the volume manager being configured to associate information related to changes made by a user to a selected file of the electronic files with the selected file; and a user interface that enables the user to view and manage, within the file management system, metadata associated with the electronic files, the user interface configured to:

i) graphically display information about the electronic files and the metadata, the information being indicative of a transactional history of the selected file; and ii) enable the user to manipulate the files and the metadata.

2. The system of claim 1, wherein said user interface includes a taxonomy for organizing and managing files.

3. The system of claim 1, wherein said user interface is configured to display and organizes files based on one or more tags.

4. The system of claim 3, wherein said user interface is configured to display values for a tag in columns and is configured to display values for files in rows.

5. The system of claim 4, wherein said user interface is configured to display a plurality of values for a file in a plurality of rows.

6. The system of claim 3, wherein a tag value is represented as an icon.

7. The system of claim 1, wherein said user interface is configured to display one or more tags associated with the files.

8. The system of claim 1, wherein said user interface includes means for enabling a user to view or change tags.

9. The system of claim 1, wherein said user interface includes a show history feature that enables a user to view what used to be in a folder in the volume but was at least one of deleted from the folder and moved from the folder.

10. The system of claim 1, wherein said user interface is configured to enable a user to open and explore at least one of i) what used to be in a folder but was deleted and ii) what used to be in a folder but was moved and to at least one of i) Undelete changed content and ii) Bring Back changed content.

11. The system of claim 1, wherein said user interface further includes an Undo feature.

12. The system of claim 11, wherein the Undo feature includes a dialog box in said user interface that brings up changes to a file or folder and an option to undo one or more changes to a file, folder or folder hierarchies.

13. The system of claim 1, wherein said user interface includes an As of View configured to display at least one off i) a folder hierarchy as of a given time and ii) contents of the volume as of the given time.

14. The system of claim 1, wherein said user interface includes a freeze feature to freeze files or folders.

15. The system of claim 14, wherein a user cannot modify frozen files or folders, and wherein the user cannot modify tags associated with the frozen files or folders.

16. The system of claim 1, wherein said user interface comprising means for enabling a user to freeze files or folders.

17. The system of claim 1, wherein said user interface includes a Show Versions feature that displays all past versions of a file or folder.

18. The system of claim 1, wherein said user interface includes a Show Versions feature that displays all frozen files.

19. The system of claim 1, wherein said user interface includes a make current feature that makes a previous version of a file a current version.

20. The system of claim 1, wherein said user interface includes a version control feature, wherein the version control feature includes a Snapshot feature that is configured to i) copy a past version of the selected file, ii) freeze the past version, and iii) associate with the past version information including who made changes to the past version, when changes where made to the past version, and why changes were made to the past version.

21. The system of claim 1, wherein said user interface is configured to enable a user to create Smart Copies, Live Copies, and Deferred Copies.

22. The system of claim 1, wherein said user interface is configured to display at least one of copies and versions of a file that reside on a different volume.

23. The system of claim 1, wherein said user interface is configured to display at least one of a hierarchy of versions of files a hierarchy of versions of folders, including modifications thereto.

24. The system of claim 1, wherein said user interface is configured to display at least one of a hierarchy of copies of files and a hierarchy of copies of folders.

25. The system of claim 1, wherein said user interface is configured to convey information regarding at least one of movement and use of files and movement and use of folders.

26. The system of claim 1, wherein said user interface enables earlier versions of files or folders to be selectably displayed.

27. The system of claim 1 wherein the coherency manager module is configured such that the electronic files are inhibited from leaving control of the system.

28. The system of claim 27 wherein the coherency manager module is configured such that the electronic files never leave control of the system.

* * * * *

UNITED STATES PATENT AND TRADEMARK OFFICE
CERTIFICATE OF CORRECTION

| | |
|---|---|
| PATENT NO. | : 7,289,973 B2 |
| APPLICATION NO. | : 10/632087 |
| DATED | : October 30, 2007 |
| INVENTOR(S) | : Kiessig et al. |

It is certified that error appears in the above-identified patent and that said Letters Patent is hereby corrected as shown below:

Column 32, line 11 states: includes an As of view configured to display at least one off and should state:

includes an As of View configured to display at least one of

Column 32, line 37 states: changes where made to the past version, and why changes and should state:

changes were made to the past version, and why changes

Signed and Sealed this

Eighteenth Day of December, 2007

JON W. DUDAS
*Director of the United States Patent and Trademark Office*